United States Patent [19]

Hall

[11] 4,412,499
[45] Nov. 1, 1983

[54] RIGGING CONNECTION ASSEMBLY

[75] Inventor: Eric R. D. Hall, Marion, Mass.

[73] Assignee: Schaefer Marine, Inc., New Bedford, Mass.

[21] Appl. No.: 258,680

[22] Filed: Apr. 29, 1981

Related U.S. Application Data

[63] Continuation of Ser. No. 164,537, Jul. 2, 1980, abandoned, which is a continuation of Ser. No. 923,824, Jul. 12, 1978, abandoned.

[51] Int. Cl.³ .............................................. B63H 9/04
[52] U.S. Cl. ....................................... 114/108; 114/90
[58] Field of Search ....................... 114/39, 75, 83, 89, 114/90, 91, 101, 102, 104, 105, 106, 107, 108, 109; 24/211 N; 128 R; 403/353, 122, 128 R; 294/74, 78 R; 52/720; 410/85, 89, 110–117

[56] References Cited

U.S. PATENT DOCUMENTS 1,656,676 1/1928 Mills ....................................... 294/74
3,343,514 9/1967 Brett ...................................... 114/108
3,867,896 2/1975 Merry .................................... 114/109
3,986,474 10/1976 King ....................................... 114/90
4,048,938 9/1977 Patterson et al. ..................... 114/75

FOREIGN PATENT DOCUMENTS 1050918 12/1966 United Kingdom .................. 114/90

Primary Examiner—Trygve M. Blix
Assistant Examiner—Jesús D. Sotelo
Attorney, Agent, or Firm—Cesari and McKenna

[57] ABSTRACT

A connection assembly for marine rigging in the form of ropes and rods employs a relatively thick rigid internal tang that is mounted in an opening in a mast or other tubular member. A keyhole is formed in the tang in the opening which is arranged to receive a key affixed to the end of the rigging. A pocket extends into the tang from the side thereof inside the mast, at a point that is spaced vertically from the keyhole. This pocket receives the rigging key after it is seated in the keyhole so that when the rigging is in its normal orientation with respect to the mast, its key is securely locked in the keyhole.

3 Claims, 7 Drawing Figures

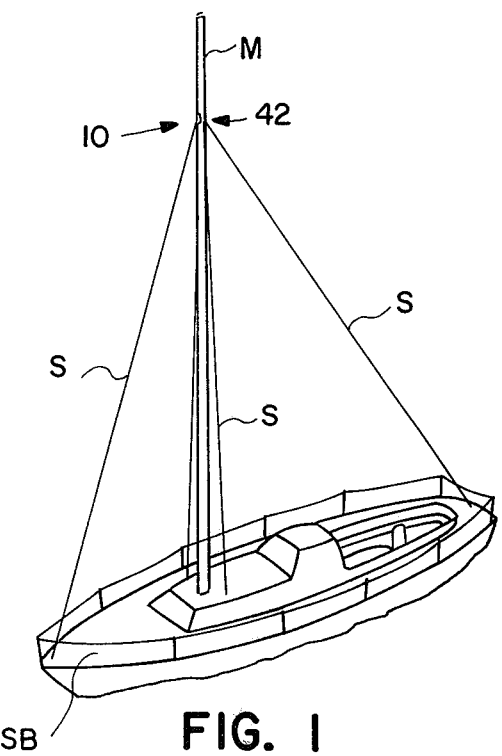
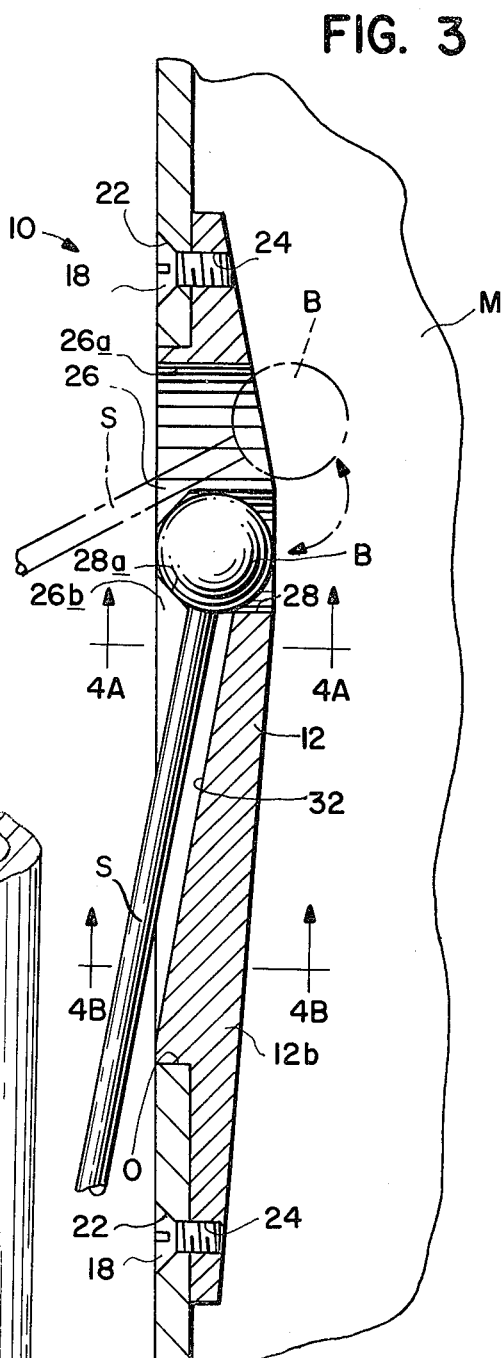
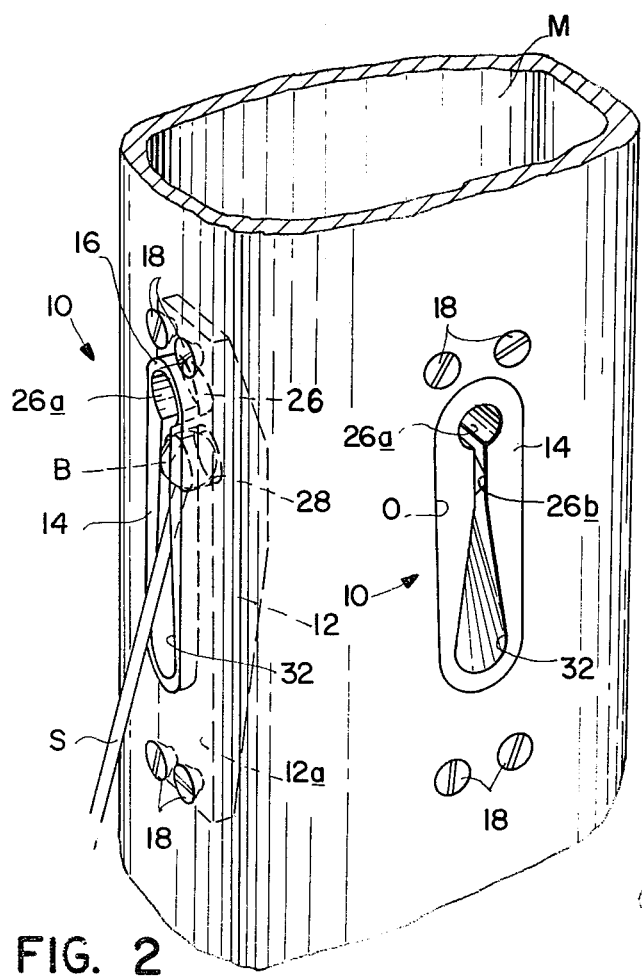
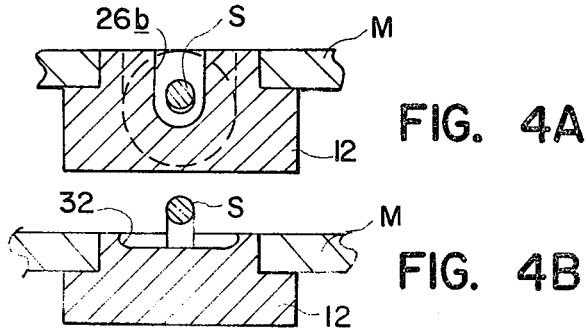
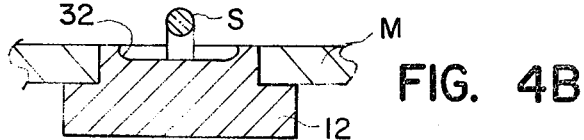

RIGGING CONNECTION ASSEMBLY

RELATED APPLICATIONS

This application is a continuation of application Ser. No. 164,537, filed July 2, 1980 which is a continuation of application Ser. No. 923,824, filed July 12, 1978, both of which applications are now abandoned.

BACKGROUND OF THE INVENTION

This invention relates to a rigging connection assembly. It relates particularly to apparatus for swivally connecting rigging in the form of a rod or rope to a mast or other tubular member.

Rigging such as guys and stays are of course used in a variety of applications to help support towers, poles and the like. The primary interest here, however, is with rigging used in marine applications, for example, to help support a mast on a sailboat. Such rigging usually consists of rods or wire ropes which extend from points near the top of the mast down to points on the boat outboard of the mast step. Since the present connection assembly has particular utility in connection with rod rigging, we will describe the invention in that context.

Conventionally, three different types of connections have been used to attach the end of a stay rod to a spar or mast. In the first type, a socket terminating in an eye is swaged onto the end of the rod. Then the eye is removably secured by means of a pin to an ear projecting out from the mast. In the second type of connection a fork type fitting is secured to the end of the rod by swaging or otherwise. Then the fork is secured to an ear projecting out from the mast by means of a clevis pin. Finally, in the third type of rod securement, a ball is formed on the end of the rod or is attached thereto by swaging. Then the ball is secured to the mast by means of a plate through which the ball projects, the plate being removably secured to the outside of the mast by screws.

All three of these conventional rod securements have certain drawbacks which cause lost time and inconvenience to the user. More particularly, in order to replace a broken stay terminated in the conventional way, pins or screws have to be removed and reinstalled. This can be difficult and time consuming, particularly if these fittings have become corroded. Also the small parts may be dropped and become lost during the course of such repair. Further, these exterior connections between the stay and the mast are invariably made at the outside of the mast. Consequently, being irregular in shape, they have relatively high wind resistance and therefore they may adversely affect to some extent the sealing characteristics of the boat.

SUMMARY OF THE INVENTION

Accordingly, it is the aim of the present invention to provide improved means for connecting marine rigging in the form of rods and ropes to a spar or mast.

A further object of the invention is to provide a rigging connection assembly which facilitates removal and replacement of the rigging for maintenance or repair purposes.

Still another object of the invention is to provide a connection between rod rigging and a mast which connection is easily made and unmade yet which cannot become disconnected inadvertently.

A further object of the invention is to provide a rigging connection assembly which presents relatively low resistance to the wind.

Other objects will in part be obvious and will in part appear hereinafter.

The invention accordingly comprises the features of construction, combination of elements and arrangement of parts as will be exemplified in the following detailed description, and the scope of the invention will be indicated in the claims.

In general, the present rigging connection assembly comprises a relatively thick, rigid tang that is mounted in an opening in the boat mast or spar. The tang has relatively large flanges which extend inside the mast beyond the edges of the mast opening permitting the tang to be permanently anchored to the wall of the mast while not projecting appreciably exteriorly of the mast.

A relatively large keyhole is formed in the portion of the tang framed in the mast opening which keyhole is arranged to receive a key affixed to the end of the stay rod. A passage is formed in the tang from the side thereof inside the mast which passage extends partially through the tang so that it intercepts the smaller portion of the keyhole and forms a pocket. This pocket receives the stay key after that is seated in the keyhole so that when the rod is in its normal orientation with respect to the mast, its key is securely locked in the keyhole.

Thus the present connection assembly comprises only two mating parts, one of which is secured to the mast. Therefore there are no small fittings that must be removed and reinstalled in order to repair and replace the stay. Consequently, such maintenance can be accomplished quickly and with relatively little inconvenience. Furthermore, all of the connection assembly parts are located inside the mast. Consequently, they do not affect the flow of air around the mast. Yet with all of these advantages the present rigging connection assembly is not appreciably more expensive than prior comparable assemblies of this general type which do not possess the aforesaid advantages.

BRIEF DESCRIPTION OF THE DRAWINGS

For a fuller understanding of the nature and objects of the invention, reference should be had to the following detailed description taken in connection with the accompanying drawings, in which:

FIG. 1 is a diagramatic view of a boat incorporating a rigging connection assembly made in accordance with this invention, FIG. 2 is an enlarged fragmentary perspective view showing the assembly in greater detail, FIG. 3 is a longitudinal sectional view with parts in elevation on a still larger scale showing the assembly in still greater detail, FIG. 4A is a sectional view along line 4A—4A of FIG. 3;

FIG. 4B is a similar view along line 4B—4B of FIG. 3;

DESCRIPTION OF THE PREFERRED EMBODIMENTS

Figure 5:
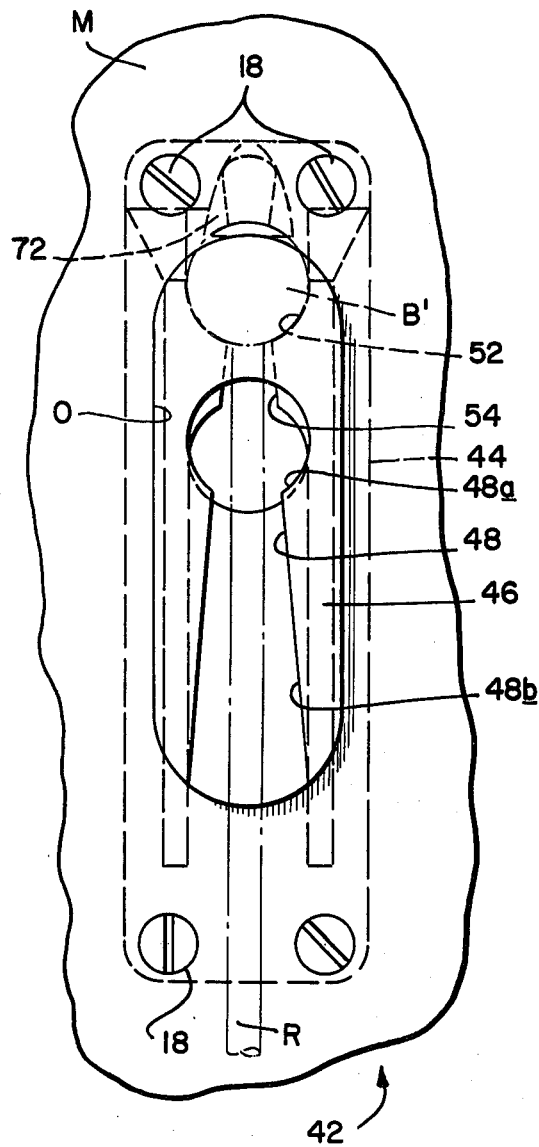
FIG. 5 is a front elevational view of another assembly embodiment.

Referring to FIG. 1 of the drawings, a sailboat SB has a hollow tubular mast M which is supported and rigidified by the usual array of stays S. The upper end of each stay S is secured to mast M by a connection assembly shown generally at 10 while the lower end of each stay is anchored to a point on the boat SB outboard of the mast step, usually by way of a turnbuckle (not shown) that may be adjusted to vary the tension in the stay. For example, a typical boat might have a fore stay, a back stay and two shrouds.

The stays on the larger boats, particularly those used for racing are often in the form of rods which have excellent tensile strength, thereby enabling a maximum compressive load to be applied to the mast M which is desirable for various reasons that need not be detailed here.

Turning now to FIGS. 2 and 3, the assembly 10 connecting each stay S to mast M comprises a relatively thick, generally rectangular rigid tang 12 positioned inside mast M. Tang 12 is formed with an elongated more or less eliptical boss 14 projecting out from its outer face 12a. The remainder of the tang face 12a surrounding boss 14 is more or less flat or it may be slightly rounded to conform to the curvature of the mast M wall. The tang is seated against the mast wall with the boss 14 being snugly received in an opening O in that wall whose shape is similar to that of the boss. Furthermore, the height of the boss 14 is more or less the same as the thickness of the mast M wall so that when the tang is properly seated, the outer surface of the boss 14 is flush with the outer wall of the mast as best seen in FIG. 3. The tang is secured to the mast by means of screws 18 extending through countersunk openings 22 in the mast wall and screwed into threaded passages 24 at the four corners of the tang 12.

A vertical keyhole 26 extends entirely through the tang including boss 14, at a point near the top of the boss. The keyhold comprises a generally cylindrical horizontal hole 26a and a communicating depending slot 26b. Also, a horizontal pocket 28 is formed in the tang that extends from the inner face 12b of the tang part way through the tang. The pocket 28 is situated just below hole 26a so that it intercepts slot 26b. The pocket 28 has more or less the same diameter as hole 26a except where its outer end 28a extends through the boss 26b. At that point the pocket only has the width of slot 26b. Therefore, the pocket is able to capture ball B with the attached stay S extending out through that slot 26b as best seen in FIGS. 3 and 4A.

In order to connect the stay S to tang 12, the stay is oriented at an angle such that the ball B at its end can be inserted through hole 26a until the ball is inside the mast. The stay is then lowered along slot 26b until the ball B is opposite pocket 28. Thereupon the stay is pulled outward so that the ball B seats in pocket 28, whereupon the stay is swung down so that its lower end can be connected by a turnbuckle to the appropriate point on the boat outboard of the mast step (FIG. 1).

In a typical instance, the stay S would be oriented at an angle of about 15° from the vertical. Accordingly, a downwardly flaring upwardly tapered trough 32 is formed in boss 14 directly below slot 26b which permits passage of the stay S down to the boat deck without interference. The trough is flared to accommodate lateral swivelling movements of the stay relative to the mast which movements ocur when the boat is under sail.

The removal of the stay S from tang 12 is accomplished by reversing the above-described procedure. That is, the lower end of the stay is released and the stay is swung up until the ball B can be dislodged from pocket 28. Thereupon, the stay is lifted up and the ball retracted through hole 26a. However, as clearly seen in FIG. 3, as long as the stay is in its normal orientation, the ball B cannot become dislodged inadvertently from pocket 28 because movement of the ball out of the pocket is prevented by the engagement of stay S with the bottom edge of slot 26b. In other words, unless the stay S is swung up so that it is more or less horizontal relative to the tang, the ball cannot be pushed out of the pocket without the stay engaging the bottom of the slot 26b. Thus, inadvertent release of the stay when the boat is under sail is practically impossible.

Figure 6:
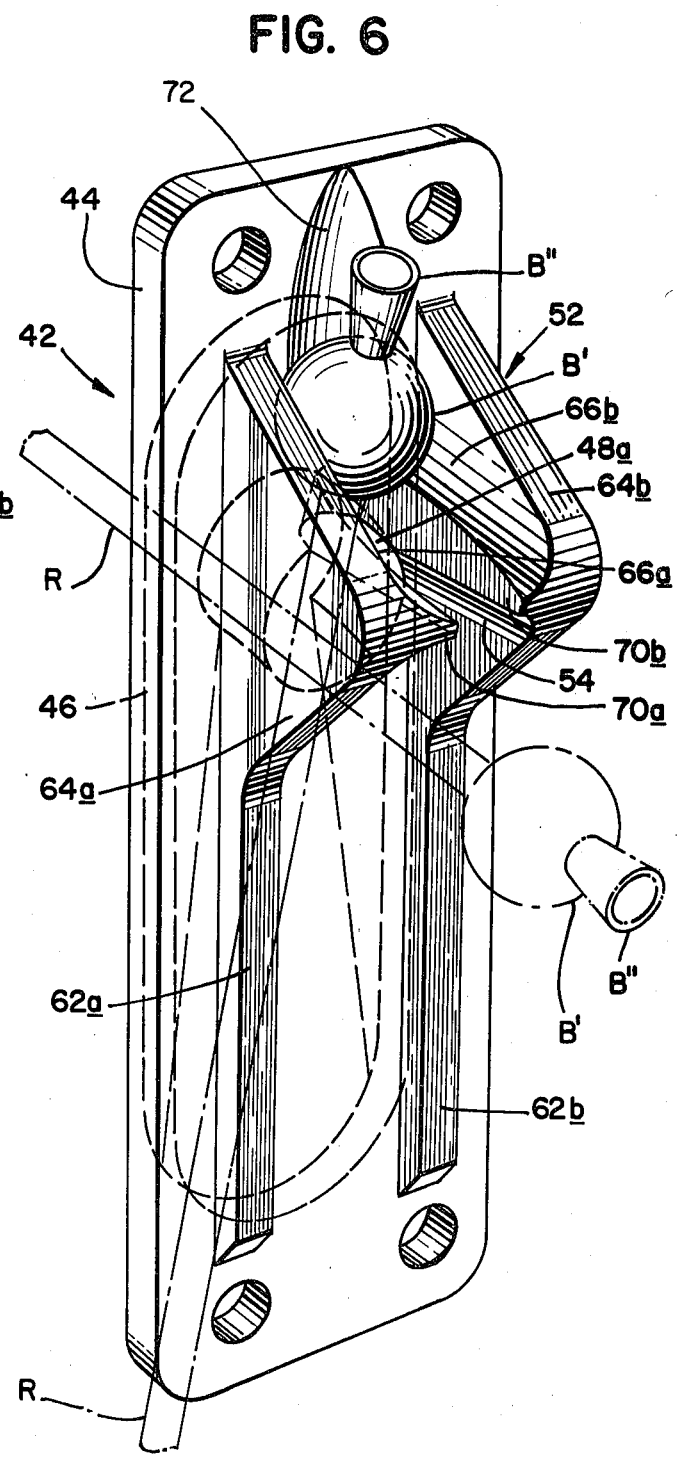
FIG. 6 is a perspective view from the rear of the FIG. 5 assembly.

FIGS. 5 and 6 illustrate a modified embodiment of the connection assembly which is especially suited for removably connecting wire rope to a mast or other support structure although it can also be used with rod rigging. This arrangement has particularly good aerodynamic characteristics.

The assembly shown generally at 42 comprises a generally rectangular tang 44 that is secured within a mast M. Tang 44 has a more or less eliptical boss 46 that projects through a correspondingly shaped opening O in mast M so that the exposed face of the boss is flush with the exterior surface of the mast. Formed in tang 44 is a keyhole 48 comprising a generally cylindrical horizontally oriented hole 48a and a depending diverging trough or groove 48b contiguous with hole 48a. Both the hole and the trough are situated in the raised boss 46 of the tang 44. The trough 48b has more or less the same depth as hole 48a where it joins that hole. However, the trough gradually becomes more shallow as the distance away from that hole increases so that the bottom end of the trough is more or less even with the front face of boss 46.

Formed in tang 44 directly above hole 48a is a pocket indicated generally at 52. Pocket 52 connects with the hole by way of a narrow throat 54 extending directly between the bottom of the pocket and the top of hole 48a. Pocket 52 is formed by a pair of spaced-apart vertical ribs 62a and 62b projecting out from the rear face of tang 44. These ribs extend from points near the bottom of the tang vertically upwards where they terminate near the top of the tang. The upper end portions of the ribs 62a and 62b extend rearwardly forming a pair of spaced-apart noses 64a and 64b. The opposing surfaces 66a and 66b of these noses are dished with the tops of those surfaces being spaced apart a distance greater than the diameter of the ball B' intended to seat in pocket 52. Those surfaces gradually converge so that at their bottoms they are spaced apart a distance substantially less than the diameter of ball B'. The rear or inboard segments of those surfaces 66a and 66b also curve toward one another so that their rearward ends 70a and 70b define the narrow throat 54 connecting the keyhole 48a with the pocket 52.

The wire rope R intended to be used with this fitting terminates in a ball B' that is swaged onto the rope in the usual fashion. Since the ball B' is generally too small in diameter to be firmly anchored onto the rope, it is customery for the ball to have a extension B" which increases its effective diameter so that when swaged, it has more of a gripping connection with the rope R.

The stay is connected to the mast by inserting the ball B' through hole 48a. In order to do this, the rope and ball must be tilted to the position shown in dotted lines in FIG. 6 wherein the rope is almost horizontal. This allows the ball B' to be inserted through the hole till it extends inwardly beyond the nose ends 70a and 70b as indicated in that same figure. Thereupon, the rope and ball can be shifted upward so that the ball B' seats in the pocket 52. The rope can then be swung down as shown in FIG. 5 and its bottom end connected to a turnbuckle (not shown) mounted on the deck of the boat. The ball B' is now oriented as shown in solid lines in FIG. 6 so that its extension B'' makes a small angle with the vertical. To accommodate swinging motions of the stay, the rear face of the tang 44 can be indented at 72 to provide clearance for the ball extension B''.

Thus as long as the lower end of the stay R is anchored, there is no possibility of the ball B' becoming dislodged from tang 44. Moreover, as best seen in FIG. 5, the stay R itself substantially fills throat 54 and a good part of hole 48a so that the effective opening through the tang into the mast is minimized. Consequently, the connection assembly adds very little wind resistance to the mast when the boat is moving.

Thus the present rigging connection assembly makes it extremely easy to connect and disconnect rod and rope rigging from a boat mast or spar. No special tools are required and there is no requirement for removing and reinstalling small fittings that could be dropped or become misplaced. Furthermore, all of the components of the connection assembly are located inside the mast proper so that they do not appreciably increase the wind resistance of the mast. Yet with all of these advantages, the present assembly should not be appreciably more expensive than prior comparable securements of this general type. Therefore, the assembly should find wide application in the marine fitting industry.

It will thus be seen that the objects set forth above among those made apparent from the preceding description are efficiently attained, and since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

I claim:

1. A rigging connection assembly for connecting a stay to a mast or other support structure comprising:

A. a round ball on one end of the stay,
   B. a tang adapted to be connected to the mast or other support structure, said tang having an exposed front face with a recessed edge margin defining a flange and a rear face for positioning inside the mast so that the flange engages the inside wall of the mast and the front face is flush with the outside wall of the mast;
   C. means defining a vertical keyhole in said tang, said keyhole having a cylindrical upper head portion extending from the front face completely through to the rear face of said tang and being sized to snugly receive said ball, and a lower neck portion communicating with said upper head portion and being sized to receive the stay, said lower neck portion including a downwardly extending trough which is recessed below the front face of said tang but which does not extend completely through to the rear face of said tang and which is tapered such that its depth below the front face decreases, and its width increases, with distance from said upper head portion, and
   D. means at the rear face of said tang defining a ball-retaining pocket, said pocket being generally cylindrical and being spaced vertically away from said keyhole head portion so that when the stay is in a first orientation relative to said tang, said ball can be inserted through said keyhole head portion from the front face of said tang and engaged in said pocket at the rear face of said tang and when the stay is in a second orientation relative to said tang, said ball is retained in said pocket with the stay projecting through said keyhole neck portion and said trough, said ball is free to swivel both laterally and vertically in said pocket and the stay is free to swivel both laterally and vertically in said trough.

2. The assembly defined in claim 1 wherein said pocket defining means are positioned on said tang above said keyhole head portion so that said key must be inserted through said head portion below said pocket before said key can be engaged in said pocket.

3. The assembly defined in claim 1 wherein said pocket defining means are positioned on said tang below said keyhole head portion so that said key is engaged in said tang by inserting it through said head portion and moving it vertically downward into said pocket.

* * * * *